May 7, 1968   R. MUNRO   3,381,394
EDUCATIONAL DEVICE
Filed April 20, 1966
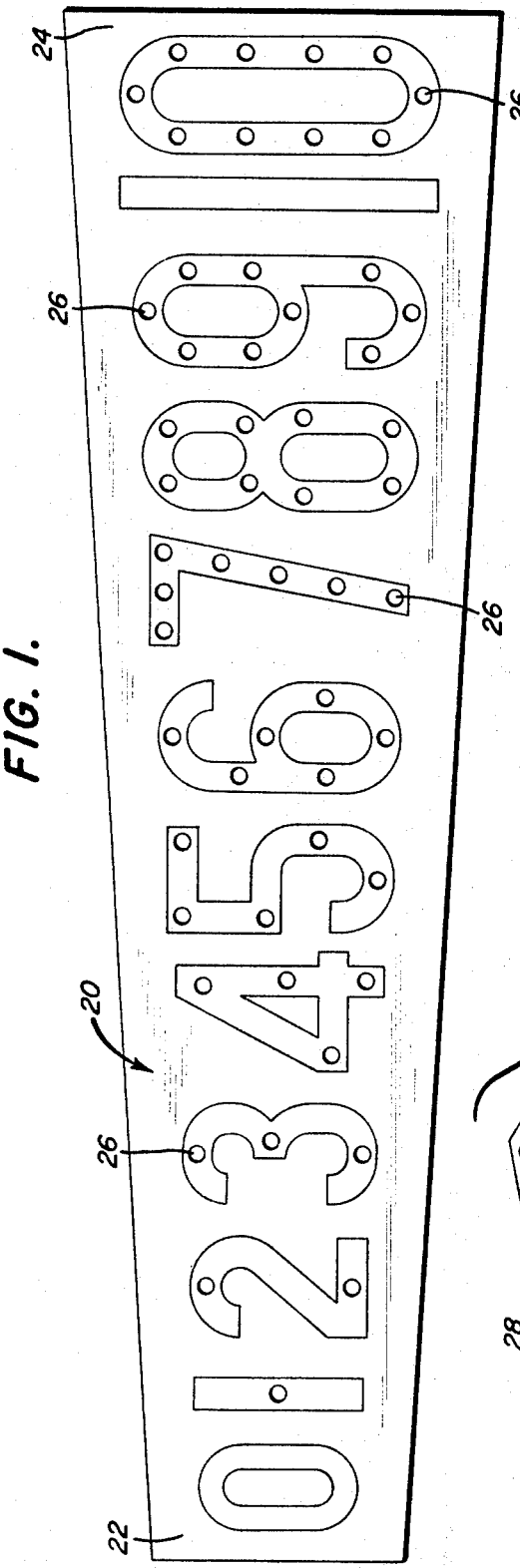
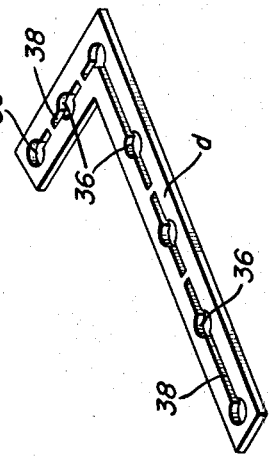
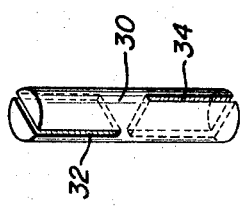
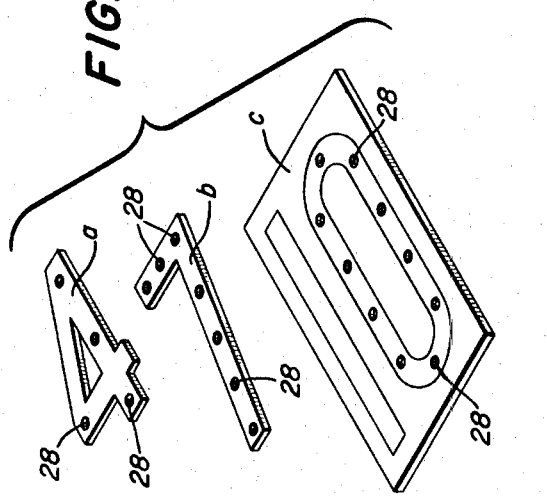
INVENTOR
*Ruth Munro*
BY *Stevens, Davis, Miller & Mosher*
ATTORNEYS 
United States Patent Office 3,381,394
Patented May 7, 1968

3,381,394
EDUCATIONAL DEVICE
Ruth Munro, 1920 S. Ocean Drive,
Fort Lauderdale, Fla. 33316
Filed Apr. 20, 1966, Ser. No. 543,867
7 Claims. (Cl. 35—31)

ABSTRACT OF THE DISCLOSURE

An educational device for teaching mathematical relationships comprising a game board, a plurality of successive numerals on the game board which increase in size progressively, a plurality of numeral shaped pieces having sizes and configurations corresponding to those of the respective numerals on the board, apertures extending through the numeral shaped pieces and the respective numerals, the number of apertures in a respective piece corresponding to the value of that numeral, pegs extending through the apertures for securing the pieces to the board, and the width of the board increasing progressively as the numerals increase in value.

---

The present invention relates to an educational device, and more particularly to an educational device for teaching young children numerical relationships and simple mathematics.

It is a principal object of the present invention to provide a novel self-help educational device for teaching children numerical and mathematical relationships. Another object of the present invention is to provide an educational device in which the increasing value of successive numerals 1, 2, 3, etc. is made evident to a child via an increasing progression in the size of the numerals and a step-wise change indicia associated with the respective numerals.

A further object of this invention is to provide an educational device for children in which various senses and skills are called into play during the learning process to assist the child in recognizing and grasping the desired relationships.

Still another object of this invention is to provide educational device in the nature of a toy which will appeal to a child's curiosity.

The educational device of this invention calls into play a number of ways of learning including vision, touch, sound, manual skill, and above all reasoning. By himself. the child may learn the meaning of the numerals, their relationship to each other, and the basic principles of mathematics.

According to one aspect of the invention, the educational device comprises a game or working board, a plurality of successive whole numerals on the board, means indicating the increasing progression of the numerals on the board, a plurality of numeral shaped pieces having sizes and configurations corresponding to respective numerals on the board, and means to secure numeral shaped pieces to the board in positions overlying the respective numerals on the board. The numerals on the board are preferably of increasing size from the lowest to the highest to indicate the increasing value. The board itself may also have a configuration which increases progressively in size as the numerals become higher. Each numeral on the board has indicia such as holes, pegs, knobs, magnetc, etc., as an integral part thereof. The number of holes, etc., associated with each numeral is equal to the value of the respective numeral. In one embodiment, the numeral shaped pieces are attached to the board via pegs which extend through apertures in the pieces into correspondingly positioned apertures in the numerals on the board.

The above and other objects, features, and advantages of this investion will become more apparent from the following detailed description, and the drawings in which FIGURE 1 is a plan view of a board in accordance with the present invention;

FIGURE 2 is a perspective view of several representative numeral shaped pieces;

FIGURE 3 is a perspective view of a peg iwhich may be utilized to secure the numeral shaped pieces to the board in accordance with one embodiment of the invention; and FIGURE 4 is a perspective view of a representative numeral shaped piece in accordance with another embodiment of the invention.

Referring now to the drawings and more particularly to FIG. 1, reference numeral 20 designates a working or game board which progressively increases in height from the left hand end 22 to the right hand end 24. A plurality of whole numerals from 0 through 10 inclusive are painted, stamped or otherwise affixed to the surface of the game board 20. As is clearly shown in FIG. 1, the height of the numerals increases progressively from 0 through 10. Apertures 26 are provided in the numerals from 1 through 10 inclusive. The number of apertures provided in each numeral corresponds to the value of that numeral. Thus, there are no apertures in the numeral 0, and there are two apertures 26 in the numeral 2, three apertures in the numeral 3, etc. The ascending order and value of the numerals is thus conveyed by the progressively increasing height of board 20, the progressively increasing height of the numerals, and the progressively increasing number of apertures provided in the respective numerals.

FIG. 2 illustrates representative numeral shaped pieces designated by reference characters a, b and c and having configurations corresponding in size and shape to the numerals 4, 7 and 10, respectively, on board 20. The pieces a, b and c are preferably made of plastic or a light weight sheet metal. Apertures 28 are provided in each of the numeral shaped pieces and are so positioned as to be in alignment with the apertures 26 in the game board when a numeral shaped piece is positioned against the corresponding numeral on board 20. Pegs 30 may be hammered through apertures 28 and into the apertures 26 in the board in order to secure the numeral shaped pieces to the board. The diameter of the pegs is preferably slightly larger than the diameter of the apertures 26, 28. In order that the pegs may be hammered or pressed into position, longitudinal slots 32, 34 are provided at opposite ends of the pegs at right angles to each other as shown in FIG. 3. The slots allow the ends of pegs 30 to be compressed in order to fit into the apertures 26, 28.

FIG. 4 illustrates another embodiment of a numeral shaped piece in accordance with the invention. In this figure, for purposes of illustration, there is shown a piece d having the configuration of the numeral 7. In this embodiment, the pieces are preferably made of a somewhat resilient material such as a synthetic plastic and provided with apertures 36 corresponding to the apertures 28 in the pieces of the previously described embodiment. Slits 38 extending entirely through the piece d are provided communicating with at least one side of an aperture 36. The slits allow for a resilient expansion in the diameter of apertures 36 when pegs 30 are hammered into the apertures, or when the numeral shaped piece is snapped onto a series of pegs already in position in apertures 26 of the board 20.

From the above description it will be evident that in each embodiment the apertures 26 and 28, or 26 and 36, constitute indicia which indicate the value of the respective numeral and at the same time afford means whereby the numeral shaped pieces may be secured to the board.

The pegs employed in the above described embodiments add to the concept of the value of the individual numerals, and in addition, the hammering of the pegs adds sound and action to keep the child's attention and to better impress upon the child the concept being learned. It will be appreciated that it is well known by educational authorities that learning and retention of facts is aided when more than one sense is called into play.

While preferred embodiments of the present invention have been shown and described, it is evident that many changes and modifications may be made therein without departing from the scope and spirit of the invention. For example, the numeral shaped pieces may be made of a magnetic material and applied to a board having magnetic means associated therewith. In such a case, the indicia designating the value of the numerals may take other shapes than the apertures referred to above, for example, stars, squares, etc. It is also contemplated that cards containing problems of addition, subtraction, multiplication or division may be provided for use after the child has grasped the initial concepts and relationships of the numerals from the above described embodiments. The cards may be of such size that numerals thereon may be of a size corresponding to the size of the numeral shaped pieces which may be secured thereon.

The substantially flat numeral shaped pieces may be used apart from the board. For example, by inserting the pegs or other means such as small flat discs into apertures in the numeral shaped pieces, the child may learn addition, subtraction etc. Raised edges, borders, rounded surfaces etc. may be used to distinguish the right side of the pieces with a mark to show the base of the numeral. In this way, the child would know how to place the pieces when tracing the same on paper or other material.

What is claimed is:

1. An educational device comprising a game board, a plurality of successive numerals arranged in a predetermined order upon one surface of said board, said numerals increasing in size progressively with increasing values of the numerals, each numeral having securing means associated therewith, the number of securing means associated with each numeral corresponding to the value of the respective numeral, a plurality of numeral shaped pieces having sizes and configurations corresponding to those of the respective numerals on the board, at least some of said numeral shaped pieces being provided with securing means to engage the securing means associated with the numerals on the board, and the number of securing means associated with a given numeral shaped piece being the same as the number of securing means associated with the respective numeral on said board.

2. An educational device according to claim 1, wherein the numerals are arranged on said board in a generally straight line fashion, and wherein the width of said board increases progressively as the numerals increase in value.

3. An educational device comprising a game board, a plurality of successive numerals arranged in a predetermined order upon one surface of said board, said numerals increasing in size progressively with increasing values of the numerals, apertures provided in at least some of said numerals, the number of apertures in each numeral corresponding to the value of the respective numeral, a plurality of numeral shaped pieces having sizes and configurations corresponding to these of the respective numerals on said board, at least some of said numeral shaped pieces being provided with apertures, said apertures in said pieces being positioned to be in alignment with the apertures in the corresponding numeral on said board upon positioning a numeral shaped piece upon the respective numeral on said board, and a plurality of pegs for securing said numeral shaped pieces to said board, said pegs being contoured to extend through the apertures in said numeral shaped pieces into the apertures on said board.

4. An educational device according to claim 3, wherein said numerals on said board are arranged in a generally straight line fashion, and wherein the width of said one surface of said board increases progressively as the numerals increase in value.

5. An educational device according to claim 3, wherein the numerals on said board range from 0 through 10 inclusive.

6. An educational device according to claim 3, wherein the numeral shaped pieces provided with apertures are further provided with slot means communicating with said apertures.

7. An educational device according to claim 3, wherein said pegs are provided at least one end thereof with a longitudinally extending slot to enable said end to be compressed.

References Cited

UNITED STATES PATENTS

| 2,839,843 | 6/1958 | Keyko | 35—73 XR |
| 3,010,228 | 11/1961 | Torre | 35—73 |
| 3,311,997 | 4/1967 | Denny | 35—31 |
| 3,357,116 | 12/1967 | Bazacos | 35—31 |

FOREIGN PATENTS

| 768,450 | 2/1957 | Great Britain. |
| 175,049 | 5/1935 | Switzerland. |

EUGENE R. CAPOZIO, *Primary Examiner.*

W. GRIEB, *Examiner.*